No. 762,164. PATENTED JUNE 7, 1904.
W. GUNDERMANN.
FOLDING PHOTOGRAPHIC CAMERA.
APPLICATION FILED FEB. 17, 1904.
NO MODEL. 2 SHEETS—SHEET 1.
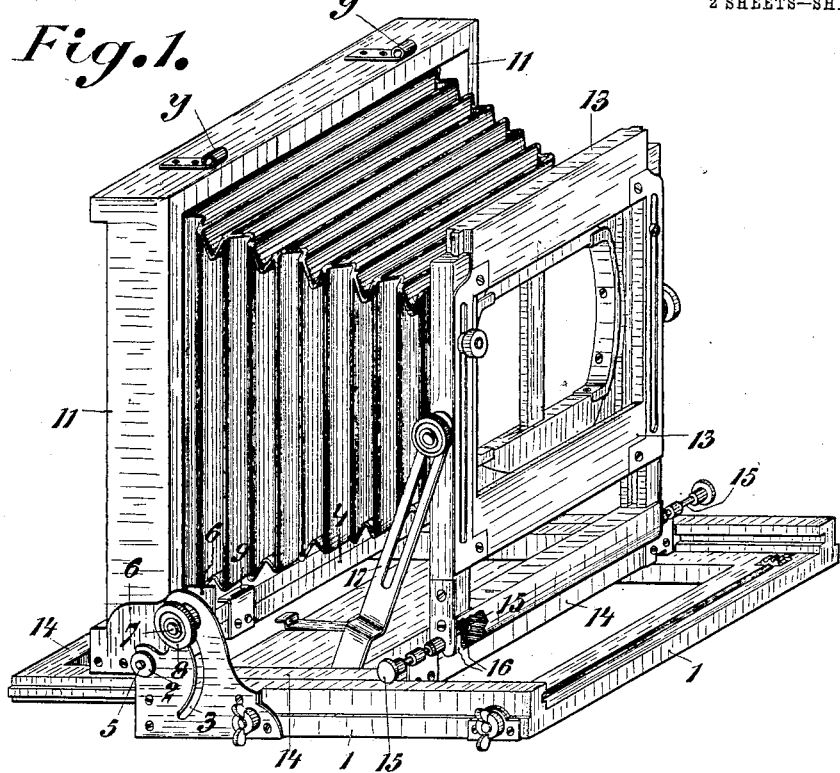
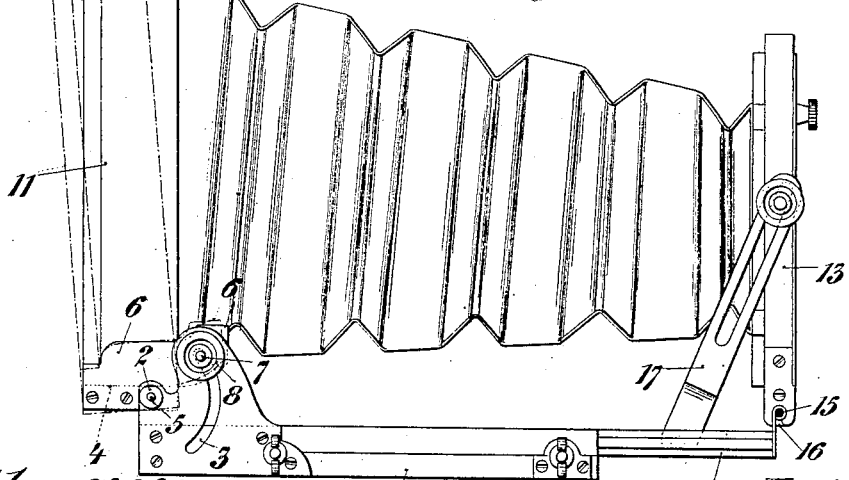
Witnesses:
Inventor
Wilhelm Gundermann No. 762,164. PATENTED JUNE 7, 1904.
W. GUNDERMANN.
FOLDING PHOTOGRAPHIC CAMERA.
APPLICATION FILED FEB. 17, 1904.
NO MODEL. 2 SHEETS—SHEET 2.
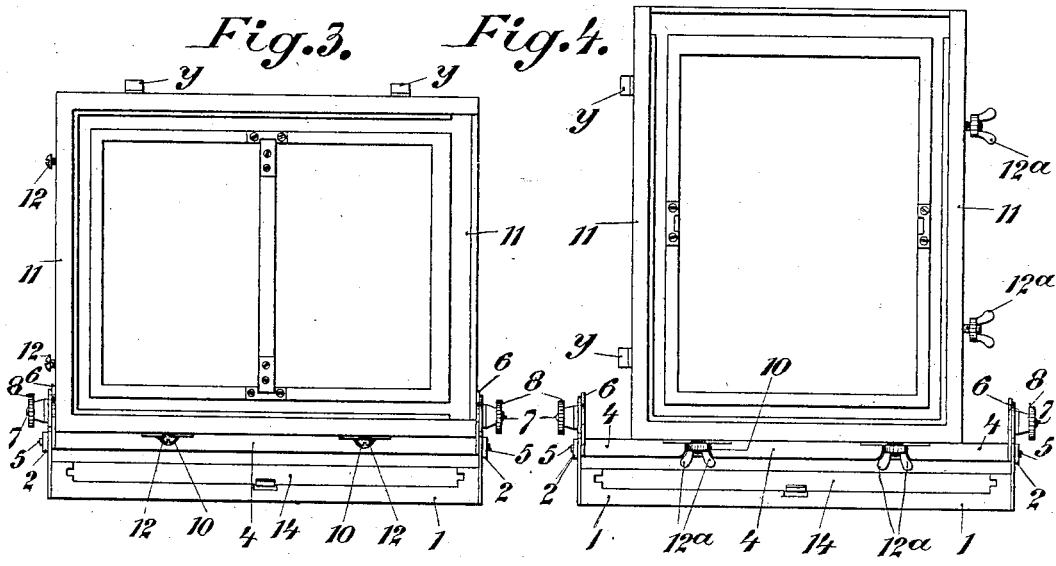
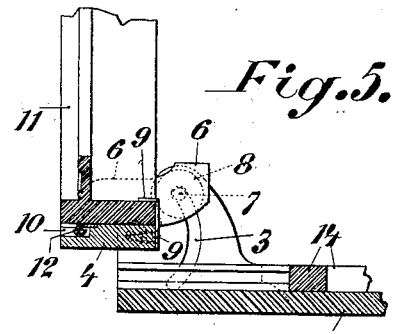
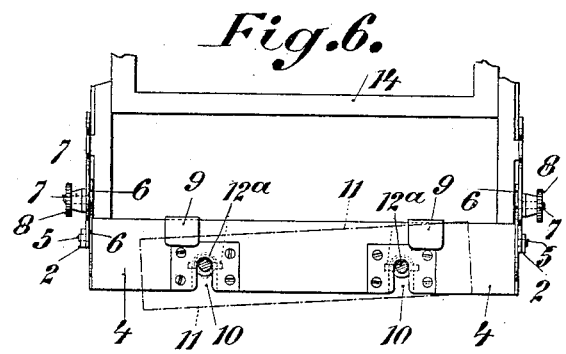
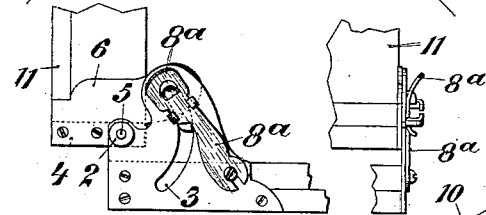
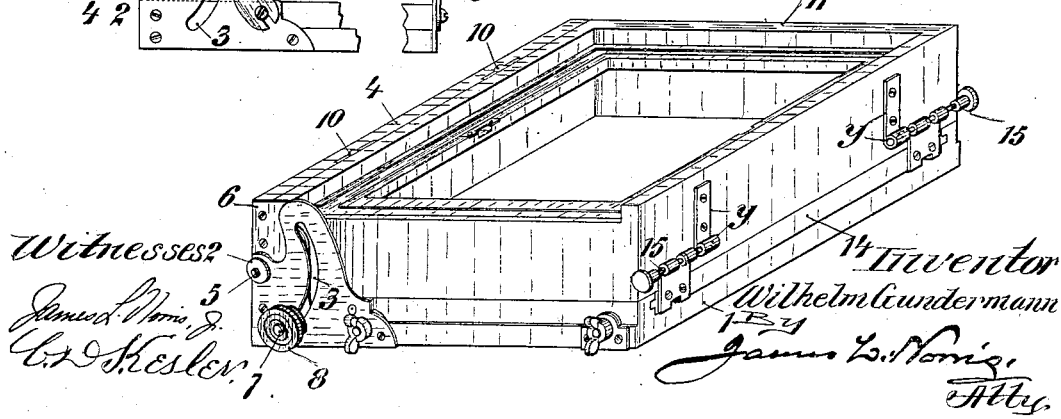
Witnesses:
James L. Norris, Jr.
C. D. Kesler
Inventor
Wilhelm Gundermann
By James L. Norris,
Atty.

No. 762,164.

Patented June 7, 1904.

UNITED STATES PATENT OFFICE.

WILHELM GUNDERMANN, OF ERFURT, GERMANY.

FOLDING PHOTOGRAPHIC CAMERA.

SPECIFICATION forming part of Letters Patent No. 762,164, dated June 7, 1904.

Application filed February 17, 1904. Serial No. 193,983. (No model.)

*To all whom it may concern:*

Be it known that I, WILHELM GUNDERMANN, confectioner, a subject of the King of Prussia, Emperor of Germany, residing at Erfurt, in the Kingdom of Prussia, German Empire, have invented certain new and useful Improvements in Folding Photographic Cameras, of which the following is a specification.

The object of my present invention is to provide a camera that should be as light and as convenient to handle as possible and which at the same time should fulfil all those other requirements which must be satisfied by the modern camera. The construction most used to fulfil all requirements as regards at least the absolute taking of the picture is the square folding form of camera. This shape takes up, however, more space than is necessary, and its weight for a given size of plate is consequently greater than that of a camera of rectangular shape corresponding to the size of plate used. The latter construction is suitable for photographic objects of great height and width by turning either the whole apparatus through an angle of ninety degrees (which principle usually results in an imperfect construction) or by leaving the base of the camera in the same position and only turning the back frame of the camera, which receives the plate-holder and focusing-screen, through an angle of ninety degrees. This change of position of the back frame of the camera has hitherto been effected from the position in which the camera was suitable for photographing high objects into the position for photographing wide objects—that is to say, the camera was made so that the longest sides of the plate should normally be vertical, but could be moved at will into horizontal position. This arrangement of the parts, however, is very awkward and inconvenient, since photographic apparatus is generally used most largely for photographing streets, landscapes, groups, &c., where the plate would be used with its long side horizontal, and it is therefore desirable to have it ready for immediate use in this position, the necessity of first moving the plate-holder from its one to the other position having been felt to be a great inconvenience. The method of changing the shape of the picture from vertical to horizontal has also up to the present been very inconvenient and complicated, and in apparatus where such change is rendered easy the arrangements made have been liable to decrease the strength and increase the weight of the apparatus.

The folding photographic camera according to this invention has been designed especially in view of the above consideration. The camera is made so that the longest side of the plate-holder is normally not vertical, but horizontal. Its new and peculiar feature lies, therefore, in the fact that, unlike most constructions hitherto known, it is made so that the long side of the plate-holder is in a horizontal, but can be moved into a vertical, position readily and without any change of the position of the base and without the use of a square back. The reason why a construction such as this has not been provided before is that the base presents its shorter side, and therefore would seem to be unsuitable for a long extension of the bellows; also, that a high position of the object-lens was considered impossible after the change to the high position and generally that all kinds of difficulties presented themselves.

The camera according to this invention, with the plate-holder normally with its long side horizontal, is very compact for the size of plate used, and is therefore light and easy to handle. It can be opened and set up with little trouble, has a device enabling stereoscopic lenses to be used, and the front (carrying the lens) and the back of the camera are pivoted about horizontal pins. The back of the camera can besides be brought into an oblique position relatively to the front, while the camera is very stable in all positions and can be folded without necessitating the unscrewing of the object lens or lenses if the base is correspondingly recessed.

A camera according to this invention is illustrated, by way of example, in the accompanying drawings, in which—

Figure 1 is a perspective view of the camera in its set-up position; Fig. 2, a side elevation of the same. Figs. 3 and 4 are back views of the camera, showing the back in its "horizontal" and "vertical" positions, respectively.

Figs. 5, 6, and 7 are detail views, Fig. 6 showing in dotted lines the oblique position that the back of the camera may be made to take up relatively to the front when the back is set at an angle to the base. Fig. 8 shows a perspective view of the camera in its folded position.

The base 1 is provided at its rear end with slotted quadrants or brackets 3, provided with bearings 2. Between these slotted quadrants is arranged a cross-bar 4, rotatably supported on the bearings 2 by means of lateral pivot-pins 5. Lugs 6 at each end of this cross-bar support screw-threaded pins 7, which freely pass through the slots in the brackets 3, said pins 7 being provided with nuts 8 at their outer extremities. The cross-bar 4 can therefore be rotated into any desired position relatively to the base and fixed by screwing up the nuts 8, Fig. 4. This cross-bar is provided at its back upper edge with slots 10. With these slots 10 engage the projecting heads of screws 12 in the back frame 11 of the camera, which frame receives the plate-holder and the focusing-screen, while the front lower edge of the said frame engages under hook-shaped lugs 9 on the cross-bar 4, Fig. 1, so that the back 11 of the camera is easily removable, Figs. 5 and 6.

Two headed screws 12, corresponding to the open slots 10 in the rotatable cross-bar 4, are arranged on one long and on one short side of the back 11, so that the latter can be set both for taking either broad or stereoscopic views or high views. (See Figs. 3 and 4.) If instead of the screws 12 screws with thumb-nuts 12$^a$, Fig. 4, are used, the back of the camera can be set obliquely relatively to the front wall 13, as shown dotted in Fig. 6.

The bearings 2 on the slotted brackets 3 of the base 1 are arranged at such level that the frame 14, longitudinally adjustable on the base and supporting the front 13 of the camera, can be withdrawn rearwardly under the cross-bar 4 in any position of said cross-bar. Owing to the frame 14 being capable of being drawn back under the back 11, the object-lens can be brought very near to or moved far away from the plate-holder.

The front upper edge of the frame 14 is provided with locking bolts or latches 15, between which the front 13 of the camera carrying the object-lens is held in a detachable manner and so that it can turn, the bolts 15 engaging in holes 16 or downwardly-opening slots in the front, Figs. 1 and 2. As the drawing in of the sliding frame 14 results in the shortening of the lateral stays and the front 13 must be placed as far forward as possible and the object-lens raised very high in order to avoid the necessity of removing the object-glass even when the camera is folded, the usual adjustment device for the front 13 of the camera with two lateral stays is not used in this case.

The camera according to this invention is therefore provided at each side with only one stay or strut 17, said arrangement having the further advantage of causing the front of the camera to stand firmly and enabling the object-lens to be raised parallel to the focusing-screen or, of course, inclined whenever necessary.

The whole front 13 of the camera also is differently constructed, as the apparatus is also intended to be used for taking stereoscopic views, and it is desirable, in spite of the width required for such an arrangement, to enable the turning of the bellows to be effected unimpeded by the lateral stays 17. On the other hand, however, by the construction of the apparatus with the longest side of the plate-holder horizontal it is rendered possible to place the front of the camera, in spite of its width, on the sliding frame 14, which would be impossible in the case of apparatus built with the plate-holder normally vertical. The width of the apparatus is thus reduced. It must also be pointed out that the same would be the case in apparatus which are square at the back, but their size would be, of course, much larger. The focusing-screen, which becomes necessary in such case, and the additional frame carrying the plate-holder make the apparatus thicker, and the whole design is increased in weight.

It must be finally pointed out that the construction of the apparatus according to this invention enables the camera to be fixed in open position, both the front and the back, by means of an automatic stop device similar to the well-known apparatus for this purpose as used in smaller apparatus, and according to this invention the set-screws 8 are done away with and replaced by spring stop-levers 8$^a$, Fig. 7.

When folding the camera, the latches or bolts 15 are withdrawn, the stays 17 released, the front 13 folded backward and downward into the frame 14, which has been previously pushed back into the base 1 or onto the base 1. The front 13 is thus perfectly flat on the adjustable frame 14. Thereupon the set-screws 8 are loosened or the stop-levers 8$^a$ pressed outward and the back 11 folded forward against the base 1 about the joint-pins 2 of the cross-bar 4 supporting it. The latches 15 form then the closing elements between the back 11 of the camera and the base 1 as they engage with eyes Y-arranged on the upper frame portion of the back 11, Fig. 8.

Having now particularly described and ascertained the nature of my said invention and in what manner the same is to be performed, I declare that what I claim is—

1. In a camera, a base, and a cross-bar supported for swinging movement above the base, said cross-bar having open-ended slots in an edge.

2. In a camera, a base, and a cross-bar supported for swinging movement above the base, said cross-bar having open-ended slots in an edge, combined with a back frame having projections on two of its sides to removably enter said slots, and lugs to engage said cross-bar.

3. In a camera, a base having plates at its rear and opposite sides, a cross-bar supported for swinging movement between the plates and above the base, said cross-bar having open-ended slots in an edge, means coöperative with the plates for holding the cross-bar in an adjusted angular position, and a frame slidably supported by the base for movement in a plane below the axis of said swinging cross-bar.

4. In a camera, a base, a slide on the base, a lens-frame, locking devices carried by the slide for holding the lens-frame in a working position, and a back frame suitably connected with the base, having eyes for engagement by said locking devices.

5. In a camera, a base, a slide on the base, a lens-frame, locking devices carried by the slide for holding the lens-frame in a working position, a back frame suitably connected with the base, having eyes for engagement by said locking devices, and a single stay for the lens-frame, connected with said slide.

In testimony whereof I have hereunto set my hand in presence of two subscribing witnesses.

WILHELM GUNDERMANN.

Witnesses:
FRITZ SCHNELL,
MAT MEYER.